United States Patent
Glad et al.

(10) Patent No.: US 12,535,888 B2
(45) Date of Patent: *Jan. 27, 2026

(54) CAPACITANCE MODULE WITH AN ANTENNA AND HAPTICS

(71) Applicant: Cirque Corporation, Sandy, UT (US)

(72) Inventors: Paul Glad, Sandy, UT (US); Douglas Steck, Riverton, UT (US); Brian Monson, Farmington, UT (US)

(73) Assignee: Cirque Corporation, Sandy, UT (US)

( * ) Notice: Subject to any disclaimer, the term of this patent is extended or adjusted under 35 U.S.C. 154(b) by 305 days.

This patent is subject to a terminal disclaimer.

(21) Appl. No.: 17/977,218

(22) Filed: Oct. 31, 2022

(65) Prior Publication Data

US 2023/0236668 A1   Jul. 27, 2023

Related U.S. Application Data

(63) Continuation-in-part of application No. 17/936,456, filed on Sep. 29, 2022, now Pat. No. 12,248,648, and a continuation-in-part of application No. 17/585,379, filed on Jan. 26, 2022, now Pat. No. 11,891,737.

(51) Int. Cl.
| | |
|---|---|
| *G06F 3/01* | (2006.01) |
| *G06F 3/044* | (2006.01) |
| *H01Q 1/22* | (2006.01) |
| *H01Q 1/52* | (2006.01) |
| *H04B 5/22* | (2024.01) |
| *H04B 5/43* | (2024.01) |
| *H04B 5/24* | (2024.01) |

(52) U.S. Cl.
CPC ............ *G06F 3/016* (2013.01); *G06F 3/0445* (2019.05); *G06F 3/0446* (2019.05); *H01Q 1/2266* (2013.01); *H01Q 1/2291* (2013.01); *H01Q 1/526* (2013.01); *H04B 5/22* (2024.01); *H04B 5/43* (2024.01); *G06F 2203/04107* (2013.01); *H04B 5/24* (2024.01)

(58) Field of Classification Search
CPC ...... G06F 3/016; G06F 3/0445; G06F 3/0446; G06F 2203/04107; G06F 1/169; H01Q 1/2266; H01Q 1/2291; H01Q 1/526
See application file for complete search history.

(56) References Cited

U.S. PATENT DOCUMENTS

| | | |
|---|---|---|
| 5,856,822 A | 1/1999 | Du |
| 6,188,391 B1 | 2/2001 | Seely |
| 6,380,930 B1 | 4/2002 | Van Ruymbeke |
| 8,743,083 B2 | 6/2014 | Zanone |
| 8,933,901 B2 | 1/2015 | Paulsen |
| 8,988,628 B2 | 3/2015 | Martisauskas |
| 9,178,267 B2 | 11/2015 | Yeh |
| 9,223,352 B2 | 12/2015 | Smith |
| 9,323,399 B2 | 4/2016 | Osoinach |
| 9,608,327 B1 * | 3/2017 | Tai ............................ H01Q 7/06 |
| 10,438,425 B2 | 10/2019 | McLeod |
| 10,485,094 B1 * | 11/2019 | Isohätälä .............. H05K 3/0014 |
| 10,606,323 B1 | 3/2020 | Chang |

(Continued)

FOREIGN PATENT DOCUMENTS

TW          201339942 A   * 10/2013

*Primary Examiner* — Md Saiful A Siddiqui

(57) ABSTRACT

A capacitance module may include at least one capacitive sensor layer; an antenna connected to the capacitive sensor layer; and at least one haptic actuator connected to the capacitive sensor layer.

20 Claims, 16 Drawing Sheets

(56) References Cited

U.S. PATENT DOCUMENTS

| | | |
|---|---|---|
| 10,877,616 B2 | 12/2020 | Liu |
| 10,924,856 B2 | 2/2021 | Liu |
| 2008/0037770 A1* | 2/2008 | Emmert ................ H04M 1/026 379/433.01 |
| 2011/0169770 A1 | 7/2011 | Mishina |
| 2011/0273382 A1 | 11/2011 | Yoo |
| 2012/0034888 A1 | 2/2012 | De Flaviis |
| 2012/0133597 A1 | 5/2012 | Chen |
| 2012/0146857 A1 | 6/2012 | Wang |
| 2013/0162594 A1 | 6/2013 | Paulsen |
| 2013/0285797 A1 | 10/2013 | Paulsen |
| 2014/0111474 A1 | 4/2014 | Bytheway |
| 2014/0253830 A1* | 9/2014 | Li ......................... G06F 3/0443 349/12 |
| 2015/0311960 A1* | 10/2015 | Samardzija ............ H01Q 1/273 455/90.3 |
| 2016/0124574 A1 | 5/2016 | Rouaissia |
| 2018/0032166 A1 | 2/2018 | Orihara |
| 2019/0148988 A1 | 5/2019 | Hwang |
| 2020/0241663 A1* | 7/2020 | Kao ....................... H04B 5/72 |
| 2023/0004193 A1* | 1/2023 | Cho ....................... G06F 1/1656 |
| 2023/0076446 A1* | 3/2023 | Worfolk ............. G06F 3/03547 |

* cited by examiner

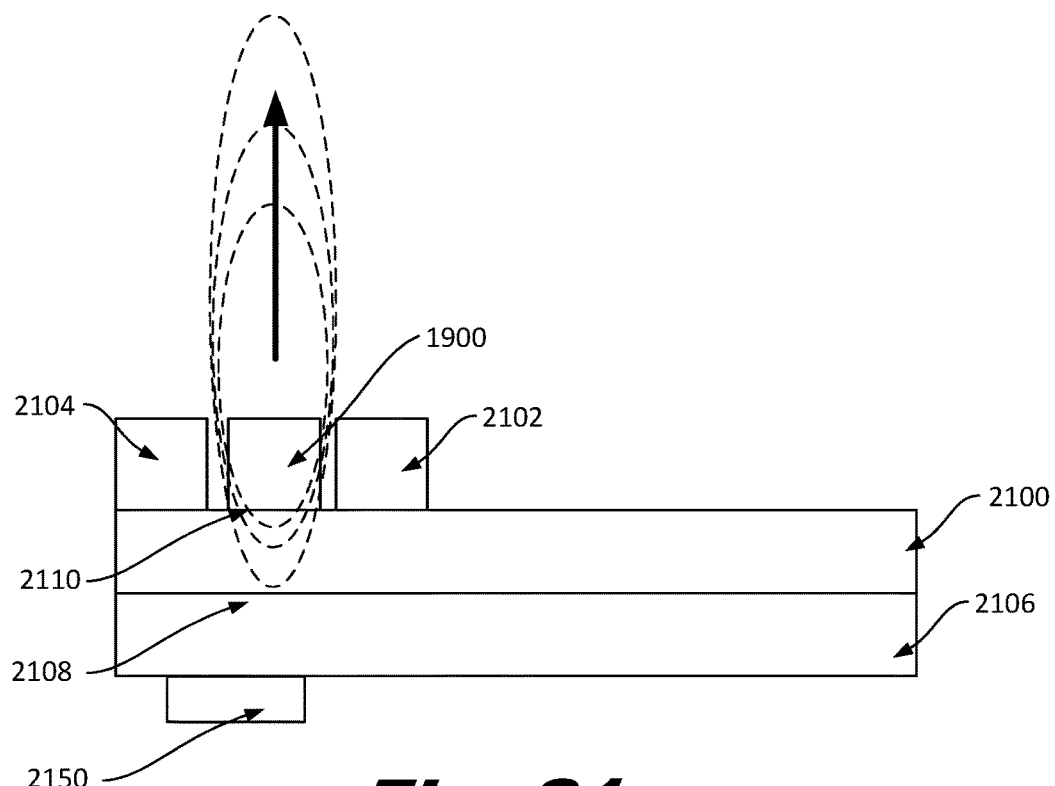
*Fig. 21a*
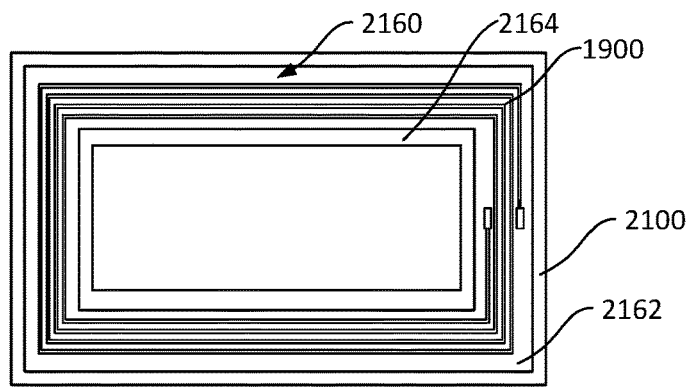
*Fig. 21b*
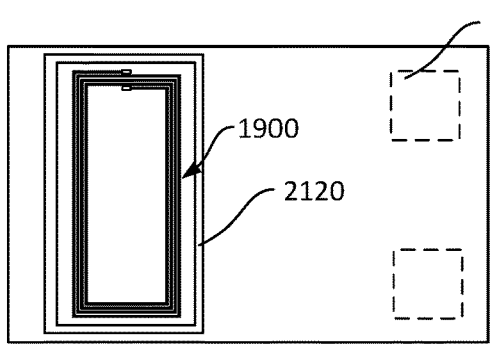 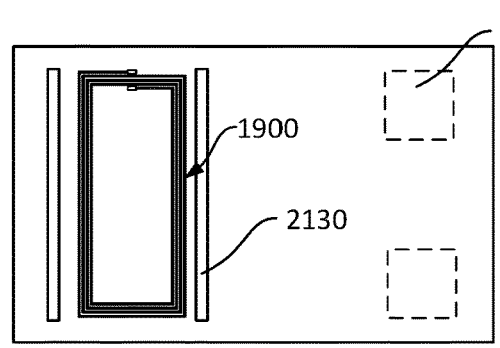
*Fig. 21c*          *Fig. 21d*

CAPACITANCE MODULE WITH AN ANTENNA AND HAPTICS

RELATED APPLICATIONS

The present Application is a Continuation-in-Part of U.S. patent application Ser. No. 17/858,379 by Tyler Smith et al., entitled "Antenna in a Capacitance Module," filed on Jul. 6, 2022, assigned to the assignee hereof, and expressly incorporated by reference herein. The present Application is also a Continuation-in-Part of U.S. patent application Ser. No. 17/936,456 by Brian Monson, entitled "Magnetically Conductive Electrically Insulating Material in a Capacitance Module," filed on Sep. 29, 2022, assigned to the assignee hereof, and expressly incorporated by reference herein.

FIELD OF THE DISCLOSURE

This disclosure relates generally to systems and methods for capacitance modules, such as a touch pad module. In particular, this disclosure relates to systems and methods for enabling radio frequencies to transmit and receive at the capacitance module with an enable haptic actuator.

BACKGROUND

Touch pads are often included on processor-based devices, such as laptop computers or the like, in order to allow a user to use fingers, styli, or the like as a source of input and selection. Additionally, processor-based devices often include radio frequency (e.g., 3 MHz-30 GHz) transmitters, receivers, transceivers, or the like (collectively, "transceivers" herein) for Wi-Fi, Bluetooth, near field communications (NFC), or the like. However, capacitive touch pads often require electrical shielding to prevent noise from the processor-based device from interfering with normal touch pad functions. When in proximity to the radio transceiver, that shielding may prevent transmission and reception of the radio frequencies.

For example, a touch pad might be the only opening in the chassis of a processor-based device (such as a laptop) and that single opening may be used for multiple purposes, such as sending and receiving Wi-Fi or NFC communications. Existing devices may place the radio frequency antenna near (e.g., underneath) the touch pad and hatch the touch pad ground plane shielding to allow some of the radio frequencies through the shielding. However, this approach often requires tuning the antenna to transmit through the shielding and tuning is often difficult. Further, the antenna system will likely waste more power than a typical installation and the performance of the touch pad may be still affected. Additionally, the above-described system may be more difficult to manufacture due to variations in the touch pad printed circuit board (PCB) affecting the antenna resonance. Other drawbacks, inconveniences, and issues with existing devices and methods also exist.

SUMMARY

In one embodiment, a capacitance module may include at least one capacitive sensor layer; an antenna connected to the capacitive sensor layer; and at least one haptic actuator connected to the capacitive sensor layer.

The antenna may be indirectly connected to the capacitive sensor layer through at least one additional layer of the capacitance sensor module.

The antenna may be directly connected to the capacitive sensor layer through at least one additional layer of the capacitance sensor module.

The haptic actuator may be indirectly connected to the capacitive sensor layer through at least one additional layer of the capacitance sensor module.

The haptic actuator may be directly connected to the capacitive sensor layer through at least one additional layer of the capacitance sensor module.

The module may include a magnetically conductive, electrically insulating barrier between the antenna and the haptic actuator.

The magnetically conductive, electrically insulating barrier may have the characteristic of preventing and/or reducing the formation of eddy currents in the haptic actuator by at least reducing an influence a magnetic field generated by the antenna from affecting the haptic actuator.

The module may include an electrically conductive shield connected to the capacitive sensor layer.

The electrically conductive shield may be indirectly connected to the capacitance layer through at least one additional layer of the capacitance sensor module.

The electrically conductive shield may be directly connected to the capacitance layer through at least one additional layer of the capacitance sensor module.

The electrically conductive shield may be between magnetically conductive, electrically insulating barrier and the haptic actuator.

The electrically conductive, electrically insulating barrier may include ferrite.

The antenna may be deposited on at least one capacitive sensor layer.

The antenna may be configured to transmit a wireless signal according to a Wi-Fi protocol.

The antenna may be configured to transmit a wireless signal according to a short-range wireless protocol.

The antenna may be configured to transmit a wireless signal according to a Near Field Communication (NFC) protocol.

The haptic actuator may include at least one piezoelectric element.

The haptic actuator may be configured to a sense a pressure applied through the capacitance sensor layer.

In one embodiment, an electronic device may include a capacitance reference surface incorporated into a device surface; a capacitance module connected to the capacitance reference surface, the capacitance module including at least one capacitive sensor layer; an antenna connected to the capacitive sensor layer; and at least one haptic actuator connected to the capacitive sensor layer.

The device may include a magnetically conductive, electrically insulating barrier between the antenna and the haptic actuator.

The magnetically conductive, electrically insulating barrier may have the characteristic of preventing and/or reducing the formation of eddy currents in the haptic actuator by at least reducing an influence a magnetic field generated by the antenna from affecting the haptic actuator.

The magnetically conductive, electrically insulating barrier may have the characteristic of focusing a magnetic field of the antenna through the capacitance reference surface.

The haptic actuator may be a piezoelectric element that is configured to provide a haptic response detectable on the capacitance reference surface and sense a pressure applied through the capacitance reference surface.

BRIEF DESCRIPTION OF THE DRAWINGS

FIG. 21a depicts an example of an antenna and a haptic actuator in accordance with the disclosure.

FIG. 21b depicts an example of an antenna in accordance with the disclosure.

FIG. 21c depicts an example of an antenna and a haptic actuator in accordance with the disclosure.

FIG. 21d depicts an example of an antenna and a haptic actuator in accordance with the disclosure.

DETAILED DESCRIPTION OF THE INVENTION

Figure 1:
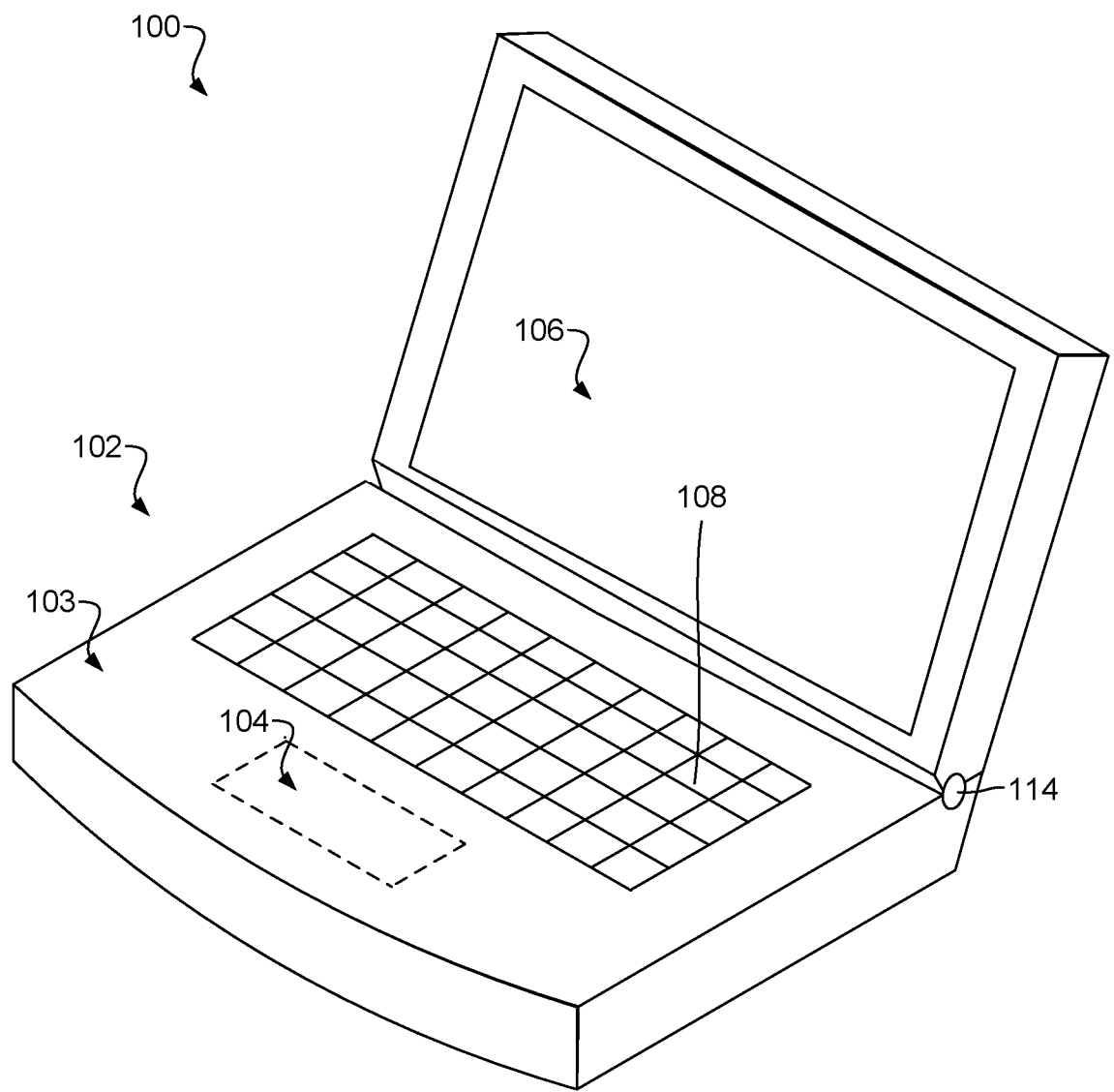
FIG. 1 depicts an example of an electronic device in accordance with the disclosure.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements. Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "near field antenna" may generally refer to an antenna that is configured to operate using a near field communication (NFC) protocol. In some cases, NFC operates in a relatively close range of less than 5 inches, 4 inches, less than 2 inches, less and an inch or another relatively close range. NFC may be based on inductive coupling between two near field antennas communicating in one or both directions. In some cases, NFC may use a frequency of 13.56 MHz band, but any appropriate frequency may be used.

For the purposes of this disclosure, the term "haptic actuator" may generally refer to an element or device that produces a haptic vibration. Any appropriate type of haptic actuator may be used. For example, a non-exhaustive list of haptic actuators includes, but is not limited to, piezoelectric actuators, linear actuators, linear resonant actuators, rotary actuators, rotatable eccentric masses, other types of actuators, or combinations thereof. In some cases, the haptic actuator may have an ability to measure pressure. Thus, the same device may be both a pressure sensor and a haptic actuator. For example, a piezoelectric element may have the ability to both sense pressure and actuate a haptic vibration.

For the purposes of this disclosure, the term "connected" may generally refer to direct connections where an object is attached directly to another object or to indirect connections where two objects are mechanically connected to each other through an intermediary object. For example, all the layers in a module may be connected to each other where a first layer may be directly connected to an adjacent second layer and a third layer may be directly connected to the second layer. In such an example, the third layer may be indirectly connected to first layer where the second layer is sandwiched between the first layer and the third layer. Further, a fourth layer may be directly connected to the third layer on an opposite side directly connected to the second layer. In this case, the second and third layers are between the first and fourth layer, and the fourth layer is indirectly connected to the first layer.

For the purposes of this disclosure, the term "magnetically conductive, electrically insulating (MCEI) material" may generally refer to any appropriate material that is generally magnetically conductive and electrically insulating. In one example, the MCEI material may have a magnetic permeability greater than air. In some cases, the MCEI has a magnetic permeability sufficiently high to keep the magnetic field out of the ground plane of the stack of layers and yet sufficiently low to minimize losses due to magnetic hysteresis. Preferably, the magnetic permeability of the MCEI material is more than ten time that of air, more than 20 times that of air, more than 40 times that of air, more than 100 times that of air, or another appropriate magnetic permeability. In some cases, the magnetic permeability is less than about 2,000. In some cases, the magnetic permeability is less than about 800. In some cases, the MCEI material has a magnetic permeability of about 125.

In some cases, the MCEI material has an electrical resistivity that is around about 12 micro-ohm cm. In some cases, the MCEI has an electrical resistivity greater than about one million ohm-cm.

The MCEI element may be made from a single material. In some cases, the MCEI material is ferrite. Ferrite may be a ceramic-like material. Ferrite may be iron-containing and made up of a large number of small crystals. Ferrite may include of iron oxide and other metals, including magnesium, aluminum, barium, manganese, copper, nickel, cobalt, another metal, or even iron itself.

In some cases, the MCEI material is a composite of individual materials that are collectively magnetically conductive and electrically insulating. For example, the material can be made from a matrix of magnetically conductive particles and also electrically insulating particles where the overall matrix prevents the conduction of electrical currents while promoting the conduction of a magnetic current. One such material that includes ferromagnetic metal particles molded in a polymer matrix is known as "powdered iron" and may be a suitable MCEI material.

In some cases, the MCEI material contains ferrite, iron, alloys of iron, mixtures of iron with other compounds, or combinations thereof. In some examples, the MCEI may include partially magnetic materials, paramagnetic materials, ferromagnetic materials, diamagnetic materials, permanent magnetic materials, magnetic absorbing materials, hard magnetic materials, soft magnetic materials, alloys thereof, mixtures thereof, composites thereof, or combinations thereof. In some cases, the MCEI material may include iron, cobalt, nickel, bismuth, tungsten, tin, titanium, pyrolytic graphite, barium hexaferrite, rare earth elements samarium, dysprosium, neodymium, aluminum, samarium cobalt, flexible rubber, alnico, strontium, barium, manganese, zinc, other metals with similar electrical properties, other metals, or combinations thereof. In some cases, the MCEI material includes laminated magnetic materials, which may include magnetic sheets that are separated by an insulating layer.

In some cases, the MCEI material may be deposited on a substrate in the stack of layers. In other examples, the MCEI material may formed separately and connected to the substrate. In some cases, the substrates in the stack of layers are separated with a dielectric. In such examples, at least one of the dielectrics may include the MCEI material. In some cases, the substrate itself may have magnetically conductive and electrically insulating materials, and therefore may be the MCEI material. In other examples, the MCEI material may be positioned adjacent to a shield layer of the stack of layer where the shield layer includes copper intended to shield the capacitance electrodes from electric noise. The MCEI material may be positioned within the stack of layers to protect the shield layer from forming eddy currents which may be generated by an inductive component or inductive components incorporated into the capacitance module. An example of an inductive element that may be near or incorporated into the capacitance module is an inductive-type of antenna. In some cases, the inductive-type of antenna may operate on a NFC protocol, but the inductive-type of antenna may operate based on any appropriate type of protocol.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
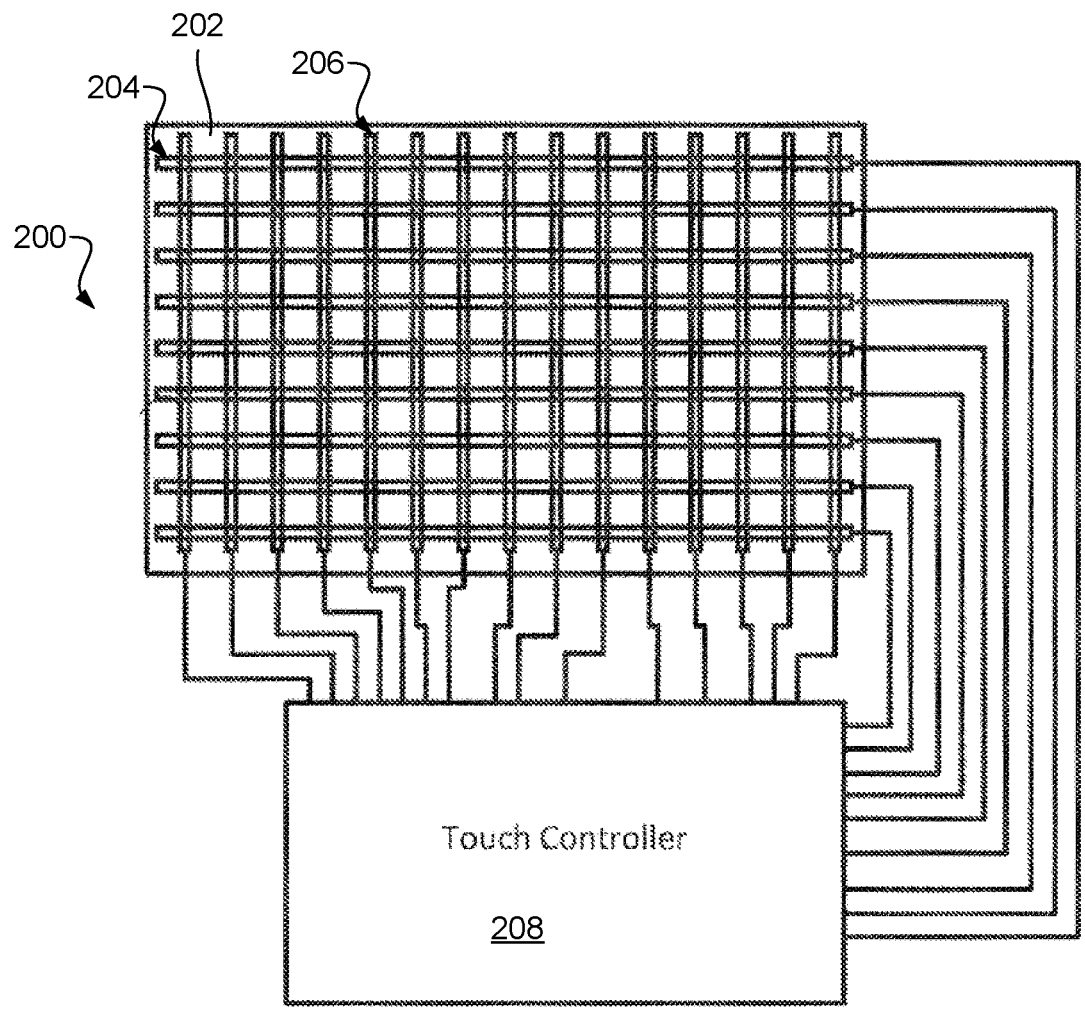
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 200 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The capacitance controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
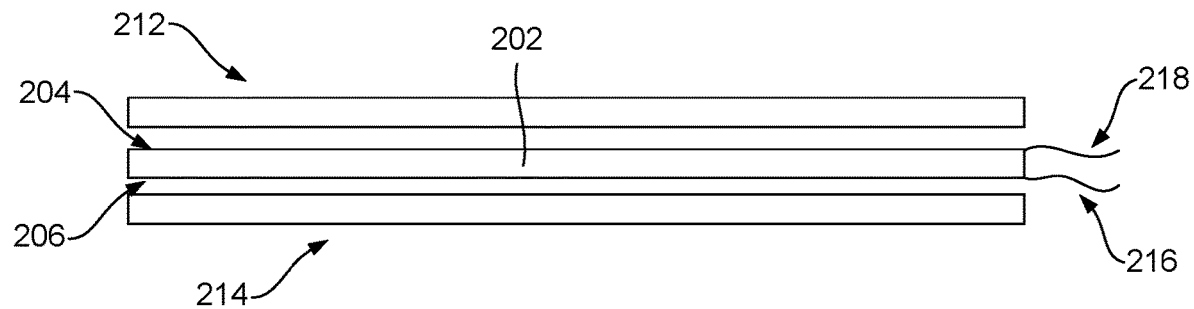
FIG. 3 depicts an example of a capacitance module in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the capacitance controller 208 to the appropriate set of electrodes. The voltage applied to the sense electrode through the electric fields generated from the transmit electrode may be detected through the electrical connection 218 from the sense electrodes to the capacitance controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
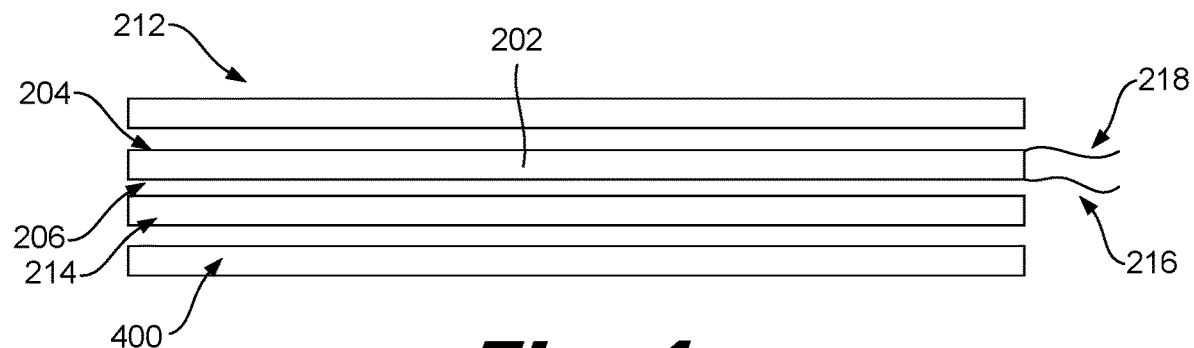
FIG. 4 depicts an example of a capacitance module in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
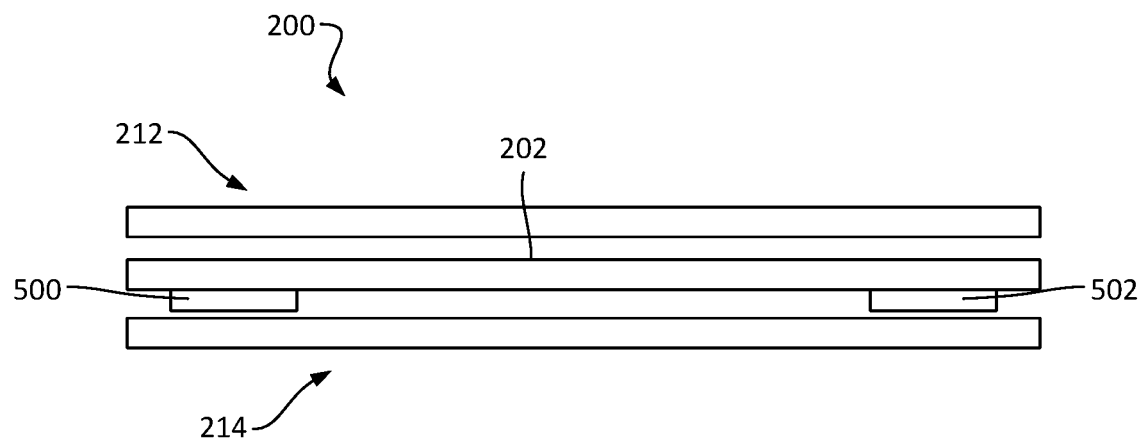
FIG. 5 depicts an example of a stack of layers in accordance with the disclosure.

FIG. 5 depicts an example of a cross section of a capacitance module 200 where the substrate 202 may be located between a capacitance reference surface 212 of an electronic device and a shield 214 of the capacitance module 200. In this example, a first pressure sensor 500 and a second pressure sensor 502 are incorporated into the capacitance module pad 200. In some examples, the first pressure sensor 500 and the second pressure sensor 502 are also haptic actuators.

As depicted in this example, the pressure sensors 500, 502 may be disposed adjacent to an underside of the substrate 202. But, in other examples, the pressure sensors may be positioned at any appropriate location, including, but not limited to, adjacent the underside of the capacitance reference surface 212, adjacent the underside of the shield, another location, or combinations thereof. In examples where the pressure sensors 500, 502 are positioned under the substrate 202, pressure applied to the capacitance reference surface 212 may be transmitted through the capacitance reference surface 212 exerting a pressure on the substrate 202, which in turn applies a pressure to at least one of the pressure sensors 500, 502. In examples where the pressure sensors are positioned adjacent to the shield, the pressure applied to input surface may be transmitted to the shield, which in turn applies the pressure to the pressure sensors. This pressure may be measured by the pressure sensors 500, 502 to determine the value of the pressure. In this example, the first pressure sensor 500 is spaced apart from the second pressure sensor 502 at a distance along a length, width, and/or another dimension of the capacitance reference surface 212, which may allow the first pressure sensor 500 and the second pressure 502 to detect different levels of pressure depending on the location where the pressure input is made on the capacitance reference surface 212. In some cases, those pressure sensors that are closer to the location where the pressure input is made can detect a greater pressure force than the pressure sensor that is located farther away. The differing pressure values may help determine where the pressure input is made.

While this example is depicted with a pressure sensor incorporated into a capacitance module with a capacitance sensor, in other examples, the pressure sensors are not incorporated with a capacitance sensor. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

In some examples, the pressure sensor may also include an ability to provide haptic feedback. For example, a piezoelectric device may be used as both a pressure sensor and as a haptic actuator. When the piezoelectric material is compressed due to the application of pressure through the capacitance reference surface, the piezoelectric material may produce an electric signal with can be detected by a controller. In some cases, the controller may produce an electric signal that is sent to the piezoelectric material to cause the piezoelectric material to expand, contract, and/or vibrate. The vibrations from the piezoelectric material may cause the capacitance reference surface to vibrate. This vibration may communicate a haptic signal to the user. However, in some examples, the pressure sensors are not configured to provide a haptic signal.

Figure 6:
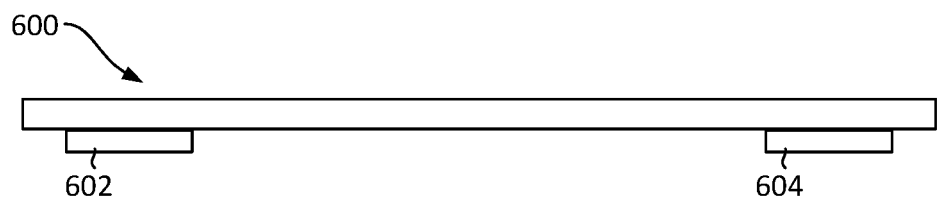
FIG. 6 depicts an example of a stack of layers in accordance with the disclosure.

FIG. 6 depicts an example of a reference surface 600. In this example, a first pressure sensor 602 and a second pressure sensor 604 are located adjacent to the reference surface 600. In this example, the first pressure sensor 602 and the second pressure sensor 604 are not incorporated into a stack having a capacitance sensor.

Figure 7:
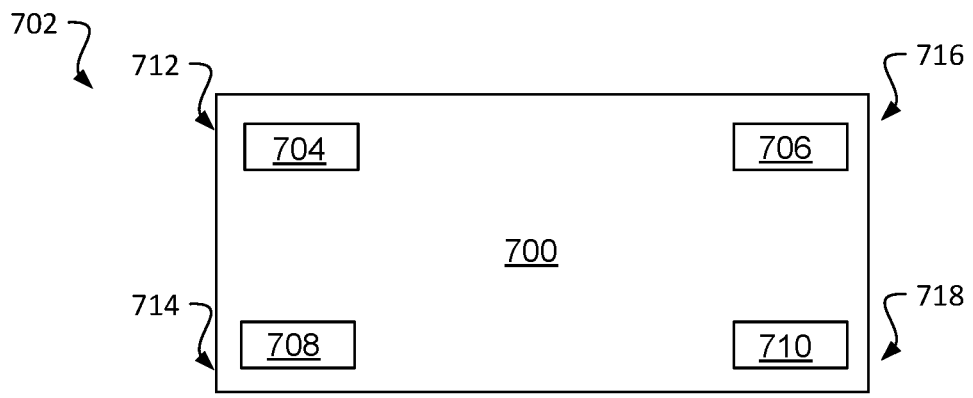
FIG. 7 depicts an example of a stack of layers in accordance with the disclosure.
Figure 8:
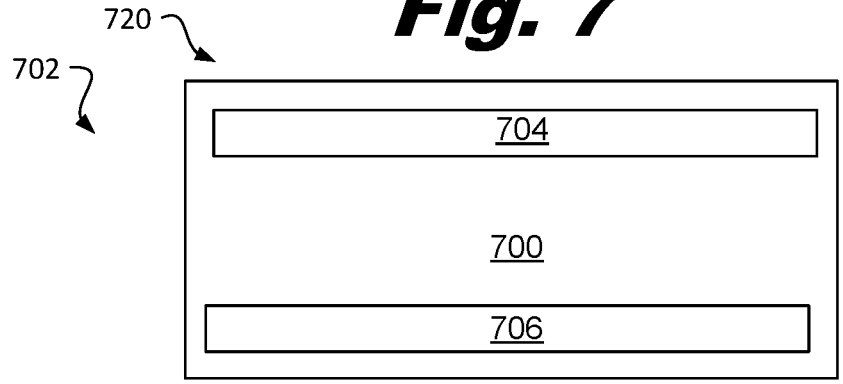
FIG. 8 depicts an example of a stack of layers in accordance with the disclosure.
Figure 9:
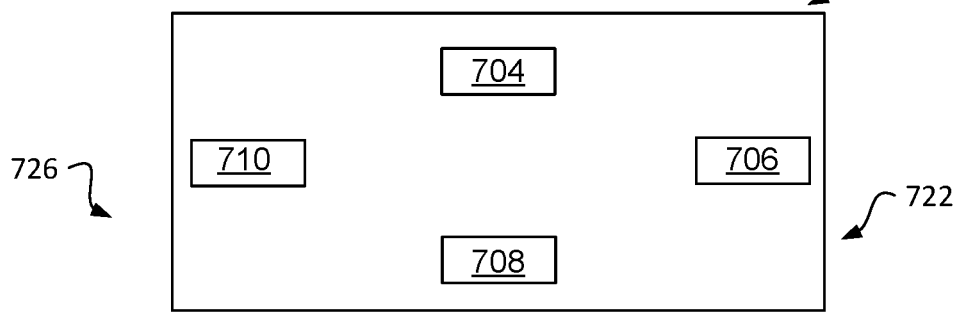
FIG. 9 depicts an example of a stack of layers in accordance with the disclosure.
Figure 10:
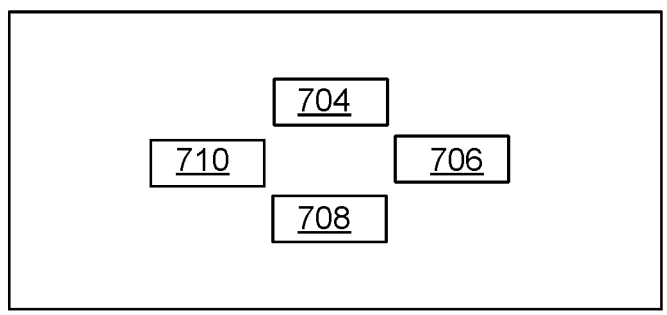
FIG. 10 depicts an example of a stack of layers in accordance with the disclosure.

FIGS. 7-10 depict examples of pressure sensors depicted on an underside 700 of a reference surface 702. In the example of FIG. 7, the reference surface 702 has a rectangular shape and pressure sensors 704, 706, 708, 710 are positioned in each of the corners 712, 714, 716, 718. In the example of FIG. 8, just a first pressure sensor 704 is depicted on a first side 720, and a second pressure sensor 706 is depicted on a second side 722 of the input surface 702. In the example of FIG. 9, the pressure sensors 704, 706, 708, 710 are depicted in the center of the first side 720, the second side 722, the third side 724, and the fourth side 726. In the examples of FIG. 10, the pressure sensors 704, 706, 708, 710 are depicted towards the center of the input surface and away from the edges and corners of the input surface 702.

While the examples in FIGS. 7-10 are described with reference to a specific number of pressure sensors, any appropriate number of pressure sensors may be disposed adjacent to the input surface. For example, the number of pressure sensors may include one pressure sensor or multiple pressure sensors. While the examples depicted above are described with reference to specific patterns and locations for the pressure sensors, other arrangements are contemplated including, but not limited to, symmetric distribution of sensors, an asymmetric distribution of sensors, other distributions and patterns of sensors, or combinations thereof.

The capacitance module may include a MCEI material in case the capacitance module is to be used near an inductive based device. In some examples, the MCEI material is incorporated into a location in the capacitance module to shield parts of the capacitance module from devices that are anticipated to be assembled near the capacitance module in a larger electronic device. For example, an inductive-type antenna may be incorporated into a mobile device, a laptop, a gaming device, a sensor, a kiosk, a screen, an infotainment system, or another type of electronic device near where the capacitance module is to be incorporated into the device. In other examples, the inductive-type device may be incorporated into the capacitance module itself, and the MCEI material may be used to shield sensitive components of the capacitance module from the inductive-type devices. For example, an inductive-type of an antenna may be incorporated into the capacitance module and the MCEI material may shield other portions or components of the capacitance module from the magnetic fields generated by the inductive-type device.

For example, the MCEI material may be positioned between an antenna and a haptic actuator. In some cases, the MCEI material may be positioned between an antenna and a pressure sensor. In some cases, the MCEI material may prevent the formation of eddy currents in a haptic actuator, a pressure sensor, a shield, a piezoelectric element, an actuator, another device incorporated into the capacitance module, another device positioned near but distinctly separate from the capacitance module, or combinations thereof.

In some examples, the MCEI material is a dielectric between the layers of the capacitance module. In other examples, the MCEI material may be a substrate of one of the layers. In yet another example, the MCEI material may be deposited on one of the substrates of the capacitance module. In yet another example, the MCEI material may be just a portion of a dielectric, deposited on just a portion of a substrate, form just a portion of a substrate, or otherwise span just a portion of the width of the capacitance module, span just a portion of the length of the capacitance module, or combinations thereof.

Figure 11:
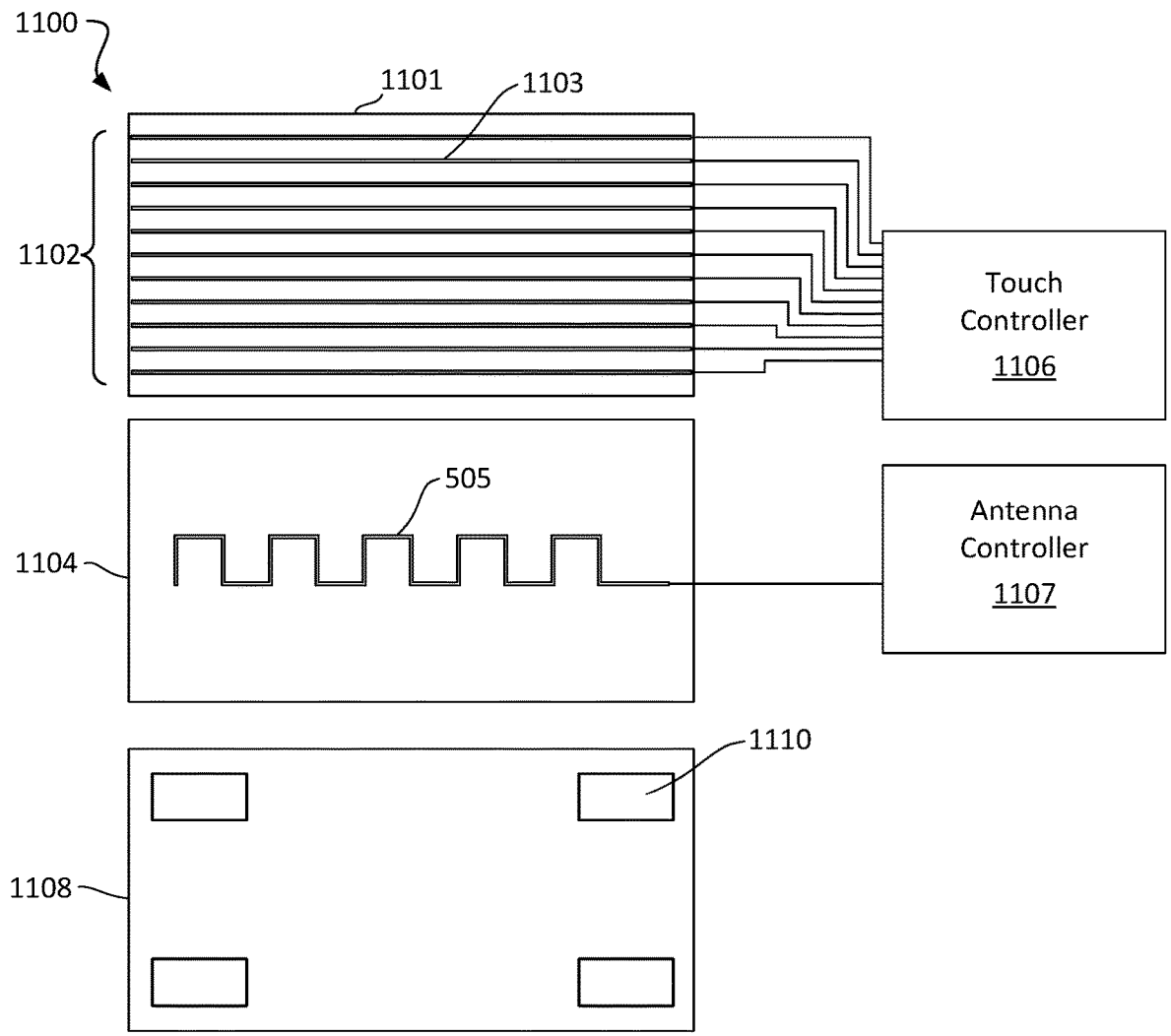
FIG. 11 depicts an example of a stack of layers in accordance with the disclosure.

FIG. 11 depicts an example of a stack of layers in accordance with the present disclosure. In this example, a stack of layers 1100 includes a sensor layer 1101, an antenna layer 1104, a shield layer 1108, and a set of haptic actuator 1110. Although three layers are identified in this example, any appropriate number of layers may be used. For example, a stack may include more or fewer layers than depicted. In some examples, a stack may include two layers, three layers, four layers, six layers, another number of layers, or a combination thereof.

In this example, the sensor layer 1101 contains a set 1102 of electrodes 1103. The electrodes 1103 may be transmit electrodes, sense electrodes, or another type of electrode. In this example, the set 1102 of electrodes 1103 forms a self-capacitance sensor. In some cases, a self-capacitance sensor uses a single set of electrodes to transmit and receive capacitance measurements. While in FIG. 11 the sensor layer 1101 contains only one identified set 1102 of electrodes 1103, a sensor layer may contain a different number of electrode sets. In some examples, a sensor layer may contain two sets of electrodes, three sets of electrodes, or another amount of electrode sets. In examples where a sensor layer contains at least two sets of electrodes, the sets may form a mutual capacitance sensor.

Each electrode 1103 in the set 1102 may be connected to a capacitance controller 1106. The capacitance controller 1106 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

The capacitance controller 1106 may control the self-capacitance sensor that is formed by the set 1102 of electrodes 1103. The capacitance controller 1106 may generate electrical signals which are applied to the electrodes 1103. When a change in capacitance occurs in the set 1102 of electrodes 1103 as a result of user input, the capacitance controller 1106 may sense the change in capacitance and interpret the change as a digital signal.

The capacitance controller 1106 may drive at least some of the electrodes 1103 in the set of electrodes 1102 simultaneously or individually. In some cases, the frequency of the electrical signals which are applied to the electrodes 1103 with the capacitance controller 1106 may be within a frequency range of 300 kHz to 1.8 MHz.

The antenna layer 1104 contains an antenna 1105 that is connected to an antenna controller 1107. The antenna layer 1104 may be a substrate or printed circuit board (PCB). In examples where the antenna layer 1104 is made of a substrate, the antenna 1105 may be etched or otherwise deposited on the substrate. In examples where the antenna layer 1104 is a PCB, the antenna 1105 may be printed on the PCB. While this example depicts the antenna layer 1104 with a single antenna 1105, in other examples, an antenna layer may contain a different number of antennas. For example, an antenna layer may contain two antennas, three antennas, or another number of antennas.

The antenna 1105 may be configured to transmit a single wireless communication protocol. While in this example the antenna 1105 is configured to transmit one wireless communication protocol, an antenna may be configured to transmit a signal according to multiple different protocols. The antenna 1105 may transmit many types of wireless protocols, including but not limited to a Wi-Fi protocol, a short-range wireless protocol, a near field communication (NFC) protocol, Zigbee protocol, or another type of protocol. In examples where an antenna is configured to transmit a signal according to multiple different protocols, the antenna may be used to transmit any combination of the wireless protocols listed.

In this example, the antenna 1105 has a square wave shape. This shape of an antenna may be used to transmit a wireless signal according to a Wi-Fi protocol or short-range wireless protocol. While this example shows an antenna with a square wave shape, other shapes of antenna are possible. For example, an antenna may have a square shape, a spiral shape, another shape, a linear shape, or combinations thereof.

The antenna 1105 may be connected to the antenna controller 1107 that may control the antenna. In order to transmit a wireless signal, the antenna controller 1107 may apply a voltage to the antenna 1105 which causes an electromagnetic wave to propagate from the antenna. In order to receive a wireless signal, an electromagnetic wave passing over the antenna 1105 induces a voltage which is interpreted by the antenna controller 1107.

The frequency of the electromagnetic waves which are either transmitted or received by the antenna 1105 may oscillate according to a specific frequency. The frequency of the wave may vary depending on the wireless protocol used by the antenna 1105. For example, an electromagnetic wave that transmits a signal according to a Wi-Fi protocol may oscillate at a frequency of 2.4 GHz or 5 GHz, whereas an electromagnetic wave that transmits an NFC protocol may oscillate at a frequency of 13.56 MHz.

In this example, the frequency range of the signals that are transmitted or received by the antenna 1105 is outside of the frequency range of the electrical signals that operate the electrodes 1103 of the sensor layer 1101. In this way, the antenna layer 1104 may be adjacent to the sensor layer 1101 and the transmission of the antenna 1105 on the antenna layer may not cause interference with the electrodes 1103. In other examples (see FIG. 17*a* & FIG. 17*b*), the frequencies of the antenna signal and electrodes may overlap.

The sensor layer 1101 and antenna layer 1104 are both located on the same side of a shield layer 1108 rather than having the shield layer between the sensor layer and the antenna 1105. In this example, the shield layer 1108 does not shield the sensor layer 1101 from the antenna 1105. However, the shield layer may block the signals from the antenna layer from reaching the haptic actuators 1110 on a different side of the shield layer. The shield layer 1108 may also block electrical signals coming from another direction that may interfere with the functioning of the electrodes 1103 on the sensor layer 1101 or the antenna 1105 on the antenna layer 1104. For example, electronic noise generated by a battery or another device positioned near the haptic actuators may be blocked from reaching the capacitance sensor and the antenna. The shield layer 1108 may be made out of copper, aluminum, an electrically conductive material, an MCEI material, ferrite, another appropriate shielding material, or combinations thereof. The shield material may be etched, printed, or otherwise deposited on a substrate of the shield layer 1108.

In this example, the haptic actuators 1110 are attached to the underside of the shield layer 1108. The shield layer 1108 is between the antenna 1105 and the haptic actuators 1110. In some cases, an MCEI material may be a dielectric between the sensor layer 1101 and the antenna layer 1104 and/or a dielectric between the antenna layer 1104 and the shield layer 1108. In some cases, an MCEI material may be deposited on the shield layer 1108. The MCEI material may have the characteristic of preventing eddy currents from forming in the haptic actuators 1110. Eddy currents may negatively influence the measurements of the capacitance sensor. In some cases, such eddy currents may heat up the haptic actuator lessening its performance and/or contributing to a shorter life span.

In some examples, an antenna may be attached to the same layer and or surface as the capacitance sensor.

Figure 12:
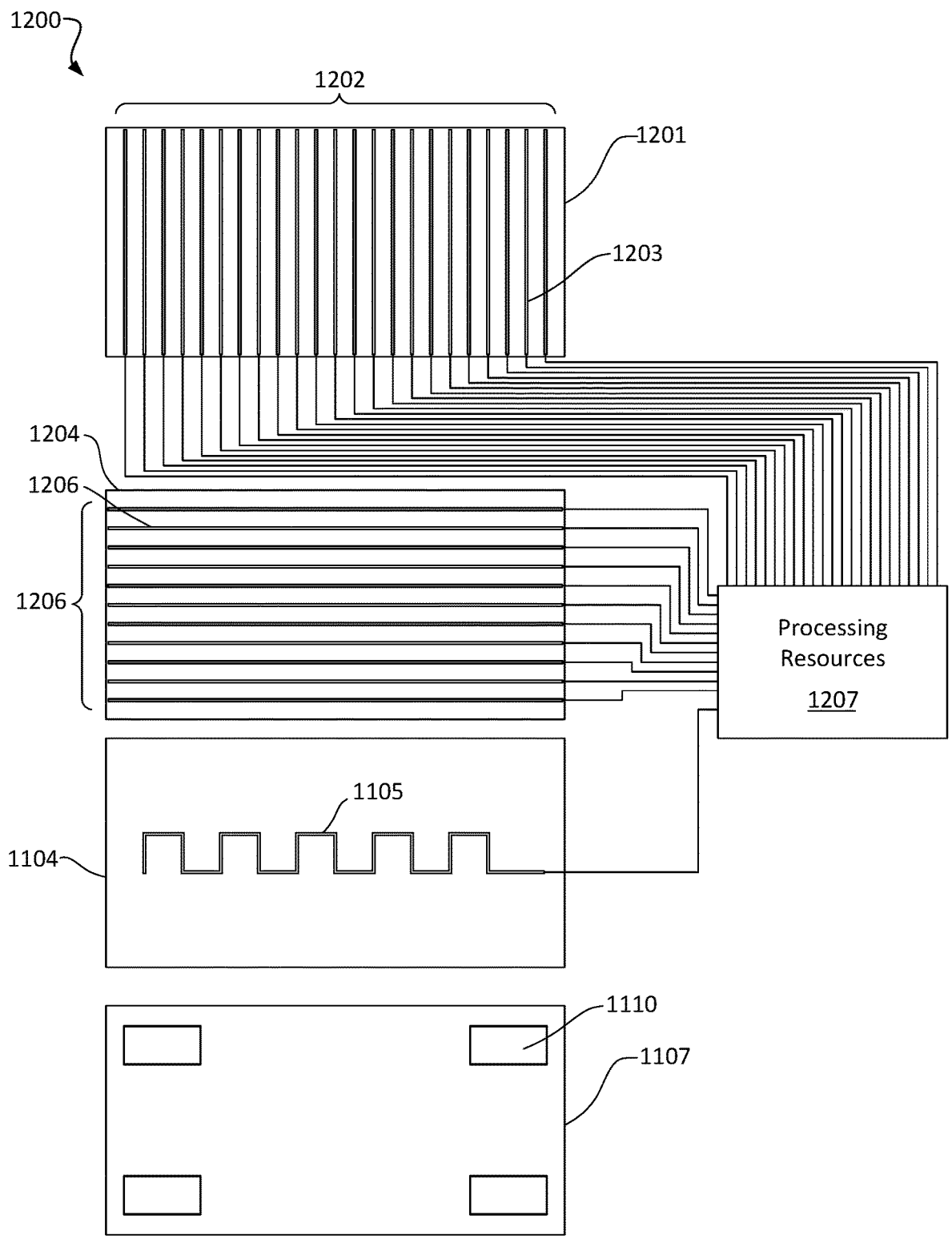
FIG. 12 depicts an example of a stack of layers in accordance with the disclosure.

FIG. 12 depicts an example of a stack of layers 1200 in accordance with the disclosure. In this example a first sensor layer 1201 and a second sensor layer 1204 are adjacent to each other. The first sensor layer 1201 contains a first set 1202 of electrodes 1203, whose electrodes 1203 may be sense electrodes, transmit electrodes, or another type of electrodes. The second sensor layer 1204 contains a second set 1205 of electrodes 1206 that may be sense electrodes, transmit electrodes, or another type of electrodes. In this example, the electrodes 1203 of the first set 1202 are transversely oriented from the electrodes 1206 on the second set 1202. Together, the first set 1202 and second set 1205 of electrodes form a mutual capacitance sensor.

In this example, the electrodes 1203, 1206 of the first set 1202 and second set 1205 of electrodes, as well as the antenna 505, are connected to processing resources 1207. In some cases, processing resources includes one or more processors. The processing resources may be located on one of the layers in the stack of layers. In other examples, the processing resources may be located off of the stack of layers, but may communicate with components in the stack of layers. The processing resources 1207 may control the behavior of the electrodes 1203, 1206 and/or the antenna 505. The processing resources 1207 may generate voltages that are applied to the electrodes 1203, 1206 and/or the antenna 505. The processing resources 1207 may also sense voltages that come from the antenna 505 and interpret the voltages according to a wireless signal protocol.

The stack of layers in FIG. 12 depicts the first and second sensor layers 1201, 1204 adjacent to each other, and the antenna layer 504 between the first and second sensor layers 1201, 1204 and the shield layer 507. While this example shows the antenna layer 504 located between the shield layer 507 and the first and second sensor layers 1201, 1204; in other examples, the antenna may be in a different location or layer in the stack. For example, an antenna may be located between a first sensor layer and a second layer, or a sensor layer may be located between an antenna layer and a shield layer.

In this example, the shield layer 1108 is directly connected to the antenna layer 1104. In other examples, the antenna layer may be omitted, and the antenna may be incorporated into the first sensor layer, the second sensor layer, the shield layer, or combinations thereof. In such examples, the antenna may be electrically insulated from the capacitance electrodes or the electrically conductive portions of the shield.

In some examples, the substrate of the antenna layer is made of an MCEI material. In yet another example, the antenna layer may include a first surface and a second surface. The antenna may be on the first surface of the antenna layer, and the haptic actuators may be directly connected to the second surface of the antenna layer. In such an example, an MCEI material may be between the antenna and the haptic actuators. For example, the antenna layer may be made of an MCEI material. In yet another example, an MCEI material may be deposited on the first surface of the antenna layer, on the second surface of the antenna layer, or both. In some examples, the haptic actuators are directly connected to an MCEI material of the antenna layer or directly connected to an MCEI material of another layer of the capacitance module.

In another example, a first side of a sensor layer may include at least one capacitance electrode, and a second side of the sensor layer may include an MCEI material. The MCEI material may be between the capacitance sensor electrode and the haptic actuator. In some cases, the haptic actuator may be connected to the MCEI material that is deposited on the second side of the capacitance sensor layer.

Figure 13:
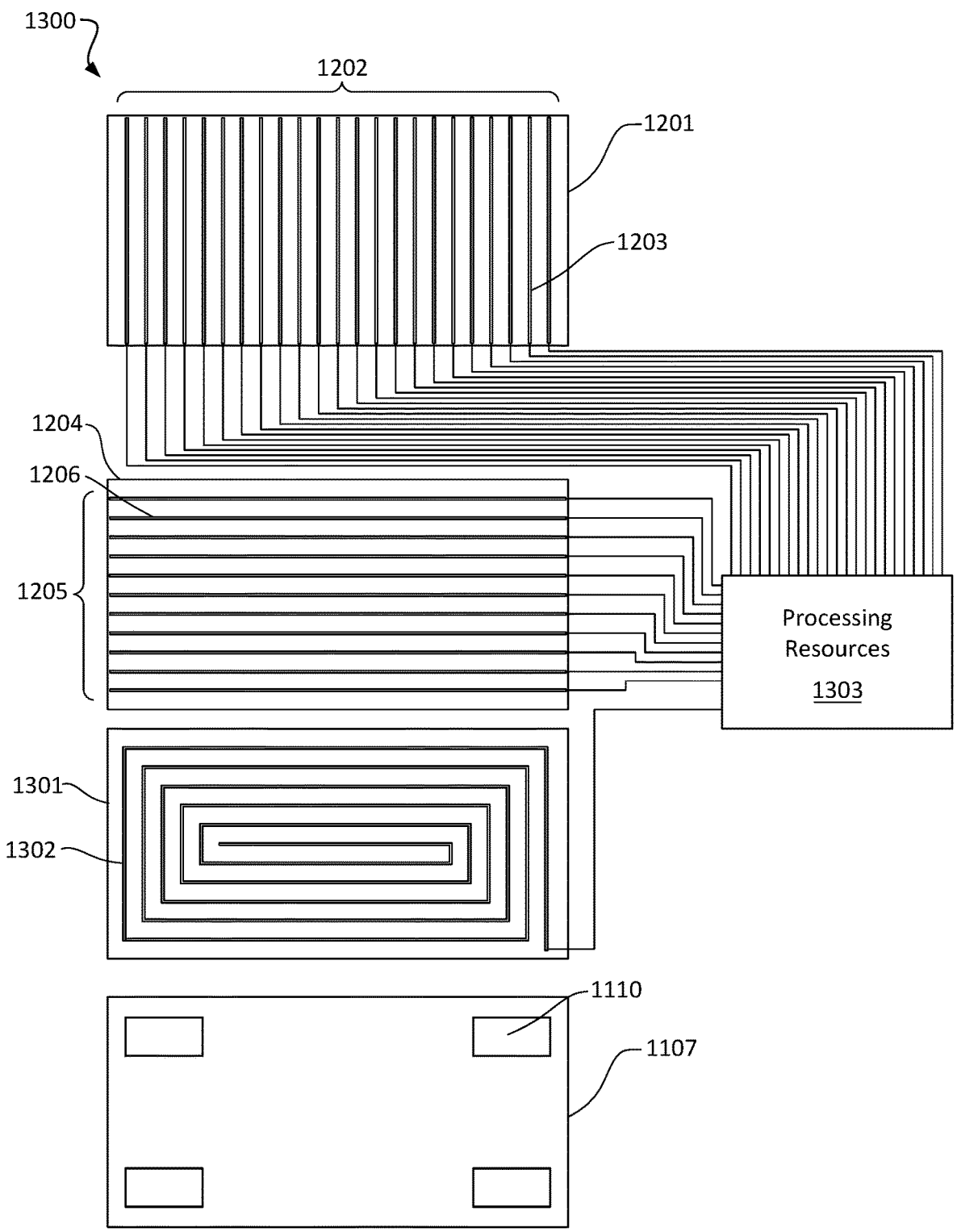
FIG. 13 depicts an example of a stack of layers in accordance with the disclosure.

FIG. 13 depicts an example of a stack of layers 1300 in accordance with the disclosure. In this example, an antenna 1302 on an antenna layer 1301 has a spiral shape. This shape of antenna may be used to transmit a wireless signal according to an NFC protocol.

In some examples, the antenna 1302 is connected to the processing resources 1303. The processing resources 1303 may also be connected to the electrodes 1203, 1206 of the first and second set of electrodes 1202, 1205. The processing resources 1303 may operate the antenna 1302 and the electrodes 1203, 1206.

In some cases, the processing resources include a processor dedicated to controlling the electrodes and another processor for controlling the antenna. In other examples, the single processor may include logic to operate at least some of the electrodes and the antenna. In other cases, multiple processors may be used to operate the electrodes, the antenna, or combinations thereof.

In this example, haptic actuators 1110 are connected to the shield layer 1302, and the shield may be between the antenna and the haptic actuators.

Figure 14:
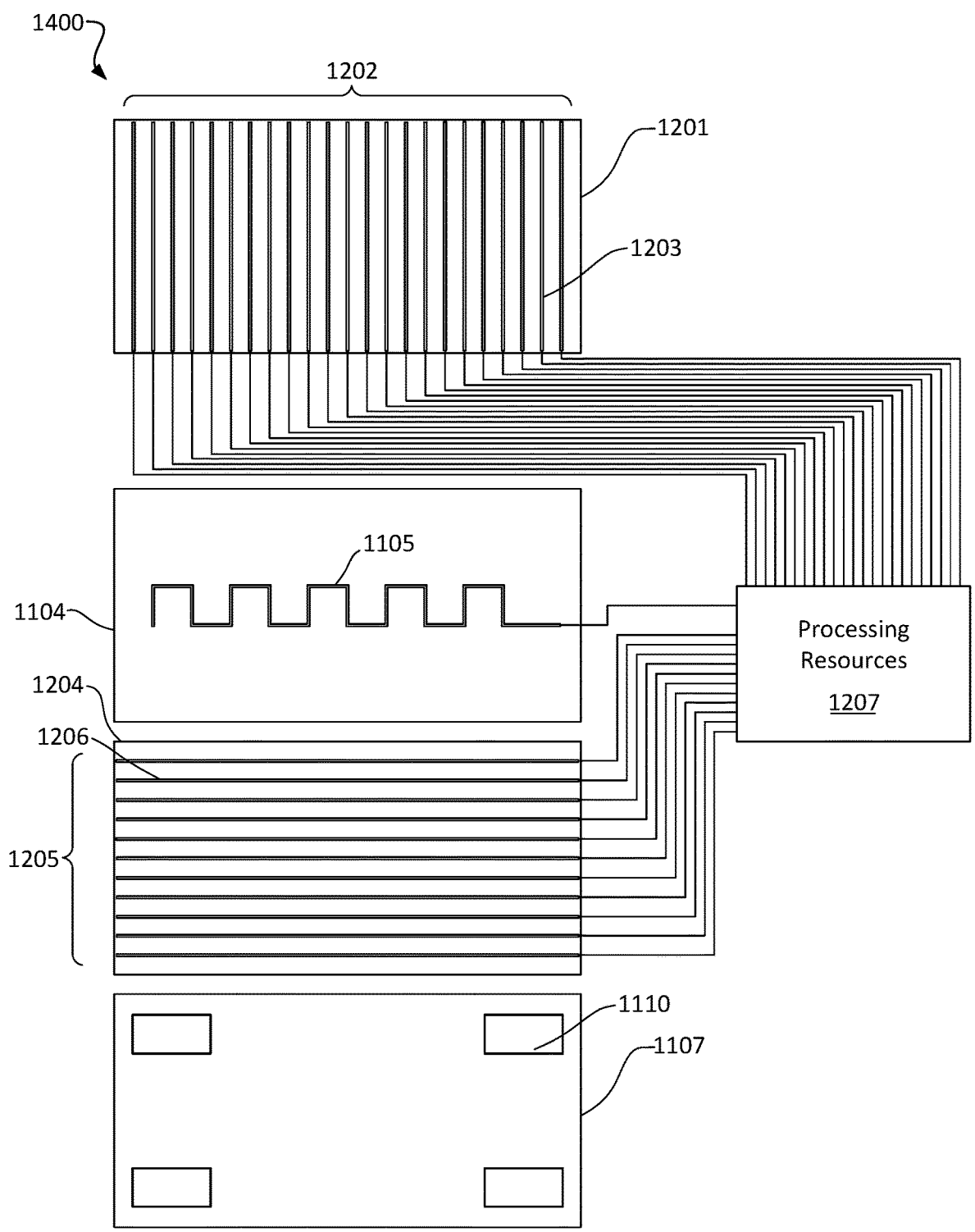
FIG. 14 depicts an example of a stack of layers in accordance with the disclosure.

FIG. 14 depicts an example of a stack of layers 1400 in accordance with the disclosure. In this example, the antenna layer 504 is between the first sensor layer 1201 and second sensor layer 1204. Each of the sensor layers 1201, 1204 and antenna layer 504 may be located adjacent to the same side of shield layer 507. The processing resources 1207 may operate both the antenna 505 and the electrodes 1203, 1206.

In this example, haptic actuators 1110 are connected to the shield layer 1302, and the shield may be between the antenna and the haptic actuators.

Figure 15:
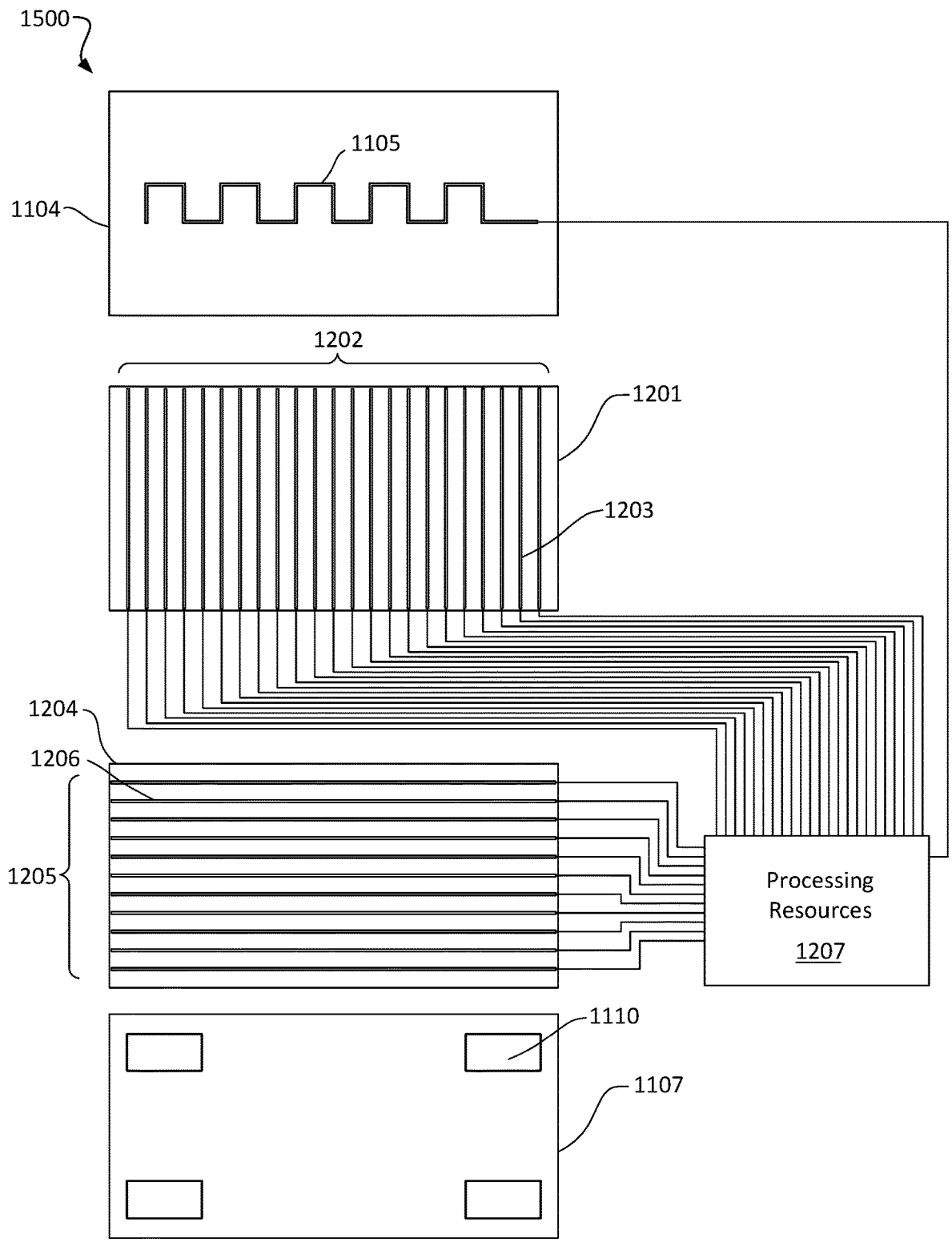
FIG. 15 depicts an example of a stack of layers in accordance with the disclosure.

FIG. 15 depicts an example of a stack of layers 1500 in accordance with the disclosure. In this example, the first and second sensor layers 1201, 1204 are adjacent to each other and between the antenna layer 504 and the shield layer 507. In examples where sensor layers are between an antenna layer and a shield layer, the sensitivity of electrodes on the sensor layer or layers may be adjusted to be sensitive to input.

In this example, haptic actuators 1110 are connected to the shield layer 1302, and the shield may be between the antenna and the haptic actuators.

Figure 16:
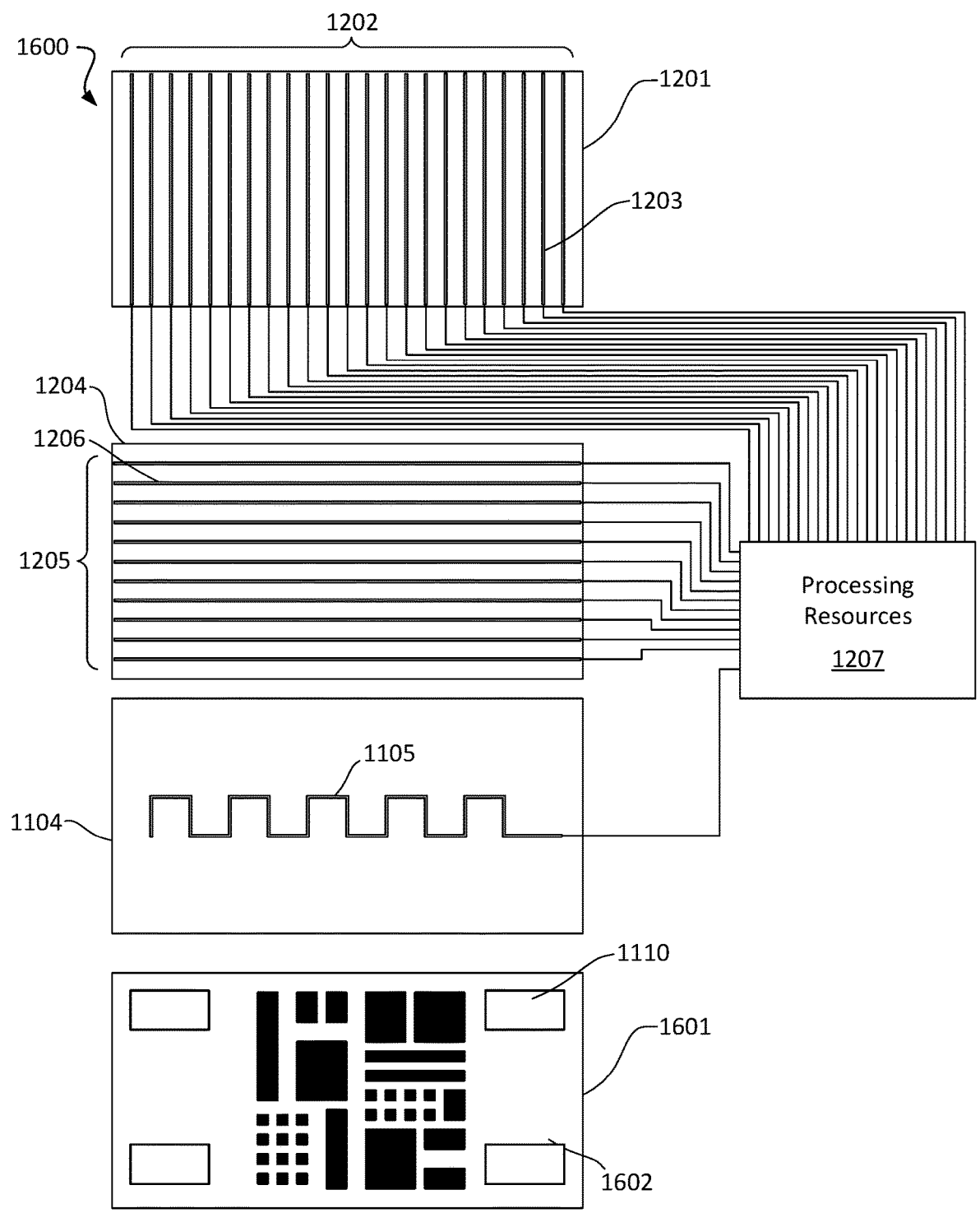
FIG. 16 depicts an example of a stack of layers in accordance with the disclosure.

FIG. 16 depicts an example of a stack of layers 1600 in accordance with the disclosure. In this example, a shield layer 1601 includes components 1602 that have other functions than to merely shield electrical interfering noise. The components 1602 may be included on the shield layer 1601, rather than on another layer, to reduce the number of layers in the stack. For example, the shield may include an electrically conductive material that is deposited on a first side of a substrate of the shield layer. The components may be secured to a second side of the substrate of the shield layer. In some examples, the first side of the substrate is opposite to the second side of the substrate of the shield layer.

Components may include but are not limited to a central processing unit (CPU), a digital signal processor (DSP), an analog front end (AFE), an amplifier, a peripheral interface controller (PIC), another type of microprocessor, an integrated circuit, a field programmable gate array (FPGA), an application specific integrated circuit (ASIC), a combination of logic gate circuitry, other types of digital or analog electrical components, or combinations thereof.

In this example, haptic actuators 1110 may be incorporated into or attached to the component side of the substrate. In this example, a haptic actuator may be located in each of the corners of the component side of the substrate. While this example is described with the shield deposited on a first side of a substrate and the components of the capacitance module are on the second side (opposite the first side), the haptic actuators may be attached to a dedicated component layer that does not include the shield.

Figure 17A:
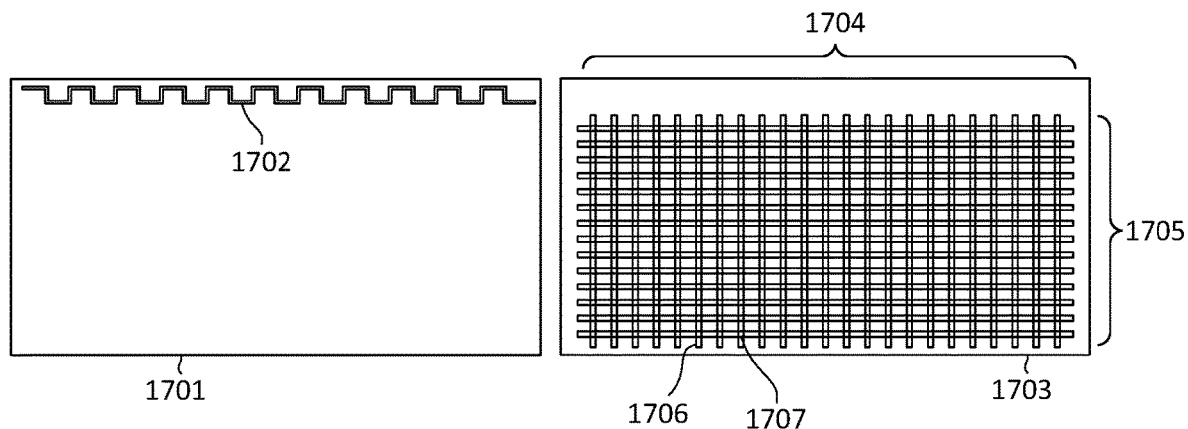
FIG. 17a depicts an example of a sensor and an antenna in accordance with the disclosure.

FIG. 17a depicts an example an antenna layer 1701 and sensor layer 1703 in accordance with the present disclosure. For illustrative purposes, the antenna layer 1701 and sensor layer 1703 are pictured side by side.

The antenna layer 1701 contains an antenna 1702. In this example, the antenna 1702 is shaped like a square wave, although in other examples, an antenna may have a different shape. This shape of antenna may be used to transmit a wireless signal according to a Wi-Fi protocol or short-range wireless protocol. The antenna 1702 is formed on a portion of the antenna layer 1701.

The sensor layer 1703 contains a first set of electrodes 1704 and a second set of electrodes 1705. The first set of electrodes 1704 contains electrodes 1706 that are placed along the length of the sensor layer 1703, whereas the second set of electrodes 1705 contains electrodes 1707 that are placed along the width of the sensor layer. The first and second set of electrodes 1704 and 1705 form a mutual capacitance sensor.

Where an electrode from the first set of electrodes 1704 overlaps with an electrode from the second set of electrodes 1705, one of the electrodes may be routed through vias in the substrate of the sensor layer 1703. By routing one electrode through the substrate, the two electrodes may be spaced apart from each other to be electrically isolated from each other to prevent the two from shorting.

Figure 17B:
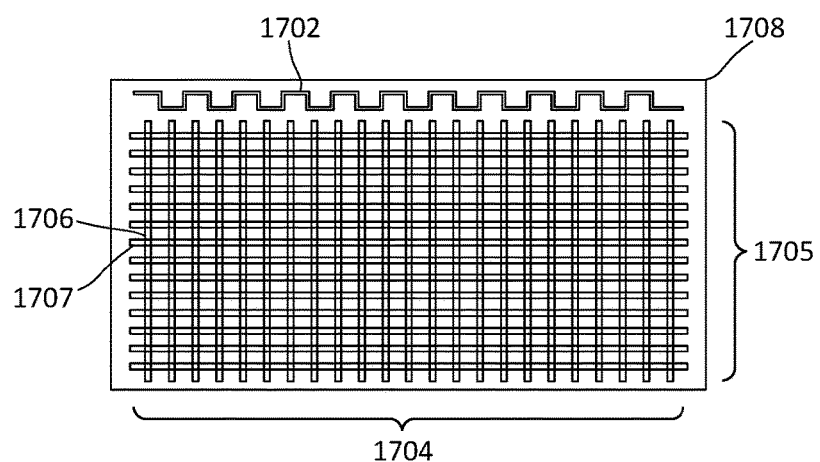
FIG. 17b depicts an example of a sensor and an antenna in accordance with the disclosure.

FIG. 17b depicts an example of an antenna formed on a sensor layer in accordance with the present disclosure. The antenna 1702 is formed on a first portion of the sensor layer 1708 and the first and second set of electrodes 1704, 1705 occupy a second portion of the senor layer where the first portion is different than the second portion. Placing the antenna 1702 on the same layer as the mutual capacitance sensor may present some advantages. One advantage may include the number of layers in the stack may be reduced. Another advantage may include that the overall thickness of an electronic device containing the capacitance module may be reduced as well.

Although in this example the antenna 1702 does not overlap with the first and second set of electrodes 1704, 1705, in other examples, the antenna and at least one electrode may overlap. For example, a mutual capacitance sensor may overlap with a portion of an antenna, or even all of an antenna.

The antenna 1702 and the mutual capacitance sensor formed by the first set of electrodes 1704 and second set of electrodes 1705 may operate within different frequency ranges. For example, the mutual capacitance sensor may operate within a frequency range of 300 kHz to 1.8 MHz, while the electrodes 1706, 1707 of the mutual capacitance sensor may operate within a frequency range of 13.56 MHz to 5 GHz. In some cases where the antenna 1702 and mutual capacitance sensor operate within different frequency ranges, they may be placed on the same layer without interfering with the other's operation.

Figure 18:
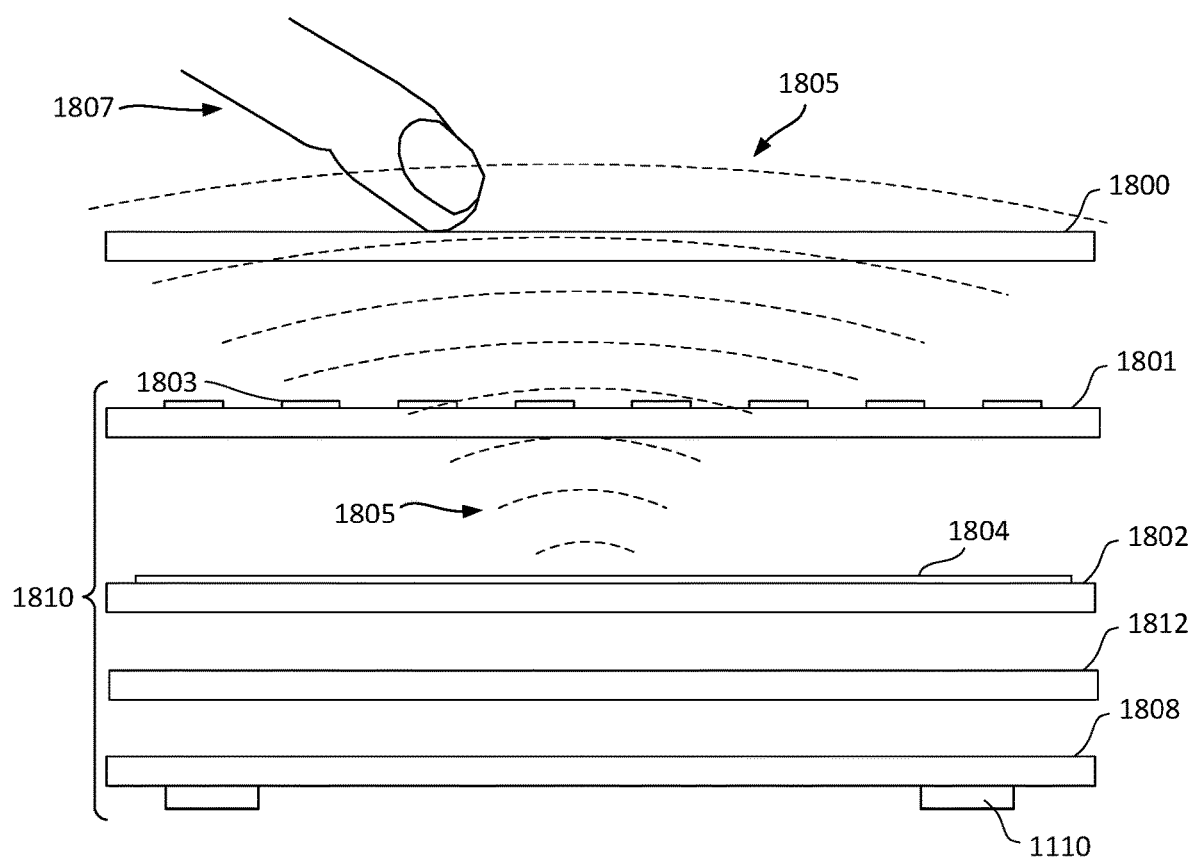
FIG. 18 depicts an example of a stack of layers in accordance with the disclosure.

FIG. 18 depicts an example of a capacitance module 1810 in accordance with the disclosure. A reference surface 1800 is positioned over the capacitance module 1810. The capacitance module 1810 contains a sensor layer 1801, an antenna layer 1802, and a shield layer 1808. In this example, an MCEI material 1812 is between the antenna layer and the shield layer 1808. In some examples, the MCEI material 1812 may be deposited on to the shield layer, bonded to the shield layer, or otherwise attached to the shield layer. In other examples, the MCEI material 1812 may be a dielectric material between layers. In yet other examples, the antenna 1804 may be located on the sensor layer, such that the capacitance module does not have a dedicated antenna layer.

Although the capacitance module is depicted with a specific number of layers. In some examples, a capacitance module may contain two layers, three layers, four layers, a different number of layers, or combinations thereof. Additionally, the relative position of each layer in a capacitance module may also be different than the positions depicted in this example. For example, although the electrode layer 1801 is in between the reference surface 1800 and the antenna in FIG. 18, in other examples, an antenna layer and electrode layer may be switched so that the antenna is between the electrode layer and a reference surface.

The reference surface 1800 may be made out of a material that an electric field or wireless transmission can pass through. The reference surface 1800 may be made of glass, plastic, a different material, or a combination thereof.

In the depicted example, the haptic actuators 1110 are attached to the underside of the shield layer 1808. The MCEI material 1812 may have the characteristic of preventing an inductive field generated by the antenna 1804 from passing. This may result in the inductive field being prevented from reaching the haptic actuators 1110. As a result, eddy currents may be prevented from forming the haptic actuators 1110. The reduction in eddy currents in the haptic actuators 1110 may prevent or at least reduce electrical noise interference that may affect the measurements with the capacitance sensor. Further, the reduction in eddy currents may prevent or reduce the haptic actuators from heating up.

Figure 19:
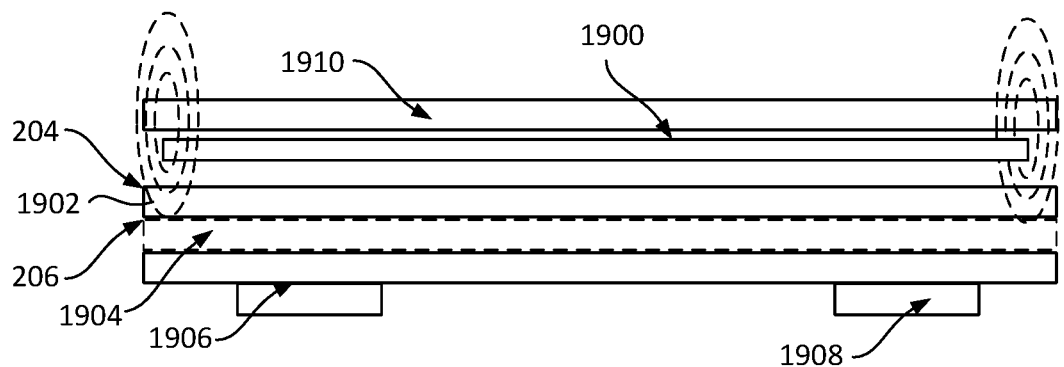
FIG. 19 depicts an example of a stack of layers in accordance with the disclosure.

FIG. 19 depicts an example of an antenna 1900 located above the substrate 1902 with the capacitance electrodes. Further, FIG. 19 also depicts an MCEI material 1904 between the shield layer 1906 and the layer 1902 with the capacitance electrodes. In this example, the magnetic field generated by the antenna 1900 can transmit a signal above the shield layer 1906 and the capacitance electrodes. However, the MCEI material 1902 may prevent the magnetic field from the antenna 1900 from generating eddy currents in the shield layer 1906 and haptic actuators 1908 attached to the capacitance module. In some examples, the magnetic field by itself may not significantly interfere with the operation of the capacitance electrodes when the eddy currents are eliminated or at least reduced in the shield layer 1904 and the haptic actuators 1908 by the MCEI material 1904.

In some examples, the MCEI material 1904 may redirect the magnetic field from the antenna 1900 to focus the signal to go through the capacitance reference surface 1910. In such an example with the magnetic field redirected, the antenna 1900 may operate at a lower power to get the antenna's signal through the components of the capacitance module to a receiver located on the other side of the capacitance reference surface 1910. Thus, in some examples, the MCEI materials 1906 may result in a power savings when operating an antenna 1900.

In the example of FIG. 19, the magnetic field from the antenna may radiate through the substrate 1902 with the capacitance electrodes. In some cases, the MCEI material is located adjacent an underside of substrate 1902 and may prevent the magnetic field from moving past (or at least diminishing the strength of the magnetic field past) substrate 1902. Thus, in some cases, the magnetic field is not detectable at the shield layer. In some cases, the magnetic field is detectable at the shield layer, but at a weaker strength than the strength of the magnetic field above the shield layer.

Although, in some cases, the magnetic field may pass through or by the capacitance electrodes, in some examples, the magnetic field may not generate eddy currents in the capacitance electrodes that are significant enough to negatively affect capacitance measurements with the capacitance electrodes. In some cases, the magnetic field may generate some interference at the capacitance electrodes, but the magnetic field may only generate less interference than would have been caused at the capacitance electrodes if the eddy currents had been allowed to be formed in the shield layer from the antenna.

The MCEI material may cause at least some of the strength of the magnetic field to move towards and through the capacitance reference surface. This may result in more of the antenna's signal being more focused in limited directions or in a single direction. Such a redirecting of the magnetic field may allow more of the antenna strength to pass through the reference capacitance surface with less energy input into the antenna than if there was not MCEI material in the capacitance module. In such an example, less energy may be necessary for the antenna's signal to be picked up by a receiving antenna that is outside of the electronic device that incorporates the capacitance module.

In some examples, the MCEI material may replace the shield layer. In such an example, the MCEI material may provide some protection from other sources that may cause electromagnetic interference with the capacitance electrodes. For example, the MCEI material may be used to weaken the electric field fluctuations from a battery that may be positioned adjacent to the capacitance module.

In other examples, an electrically conductive material may be deposited on a surface of the MCEI material making a composite shield that is electrically conductive on one side and electrically insulating on the other side. Such a composite shield may block electric fields on a first side and magnetic fields on a second side. Such a composite shield may effectively block the electric fields and magnetic fields.

Figure 20A:
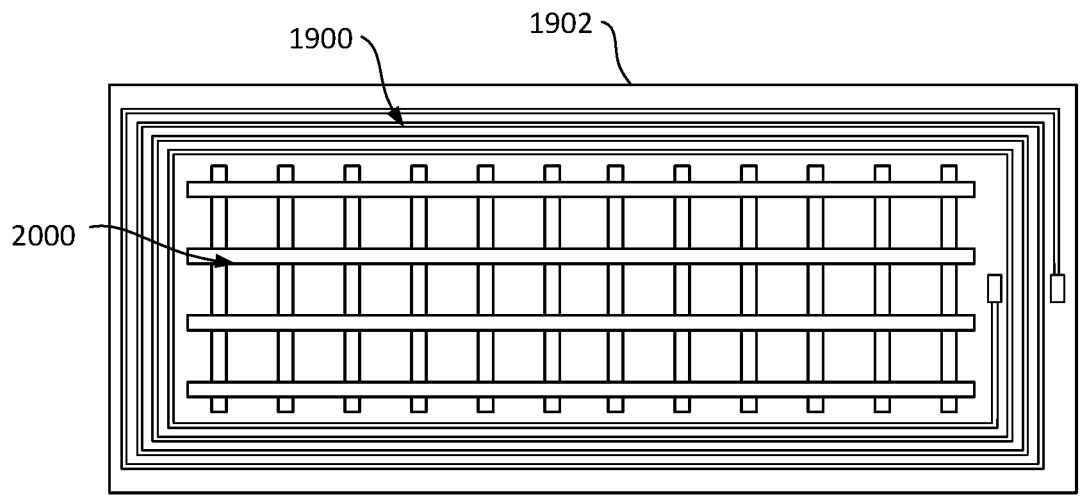
FIG. 20a depicts an example of a sensor and an antenna in accordance with the disclosure.
Figure 20B:
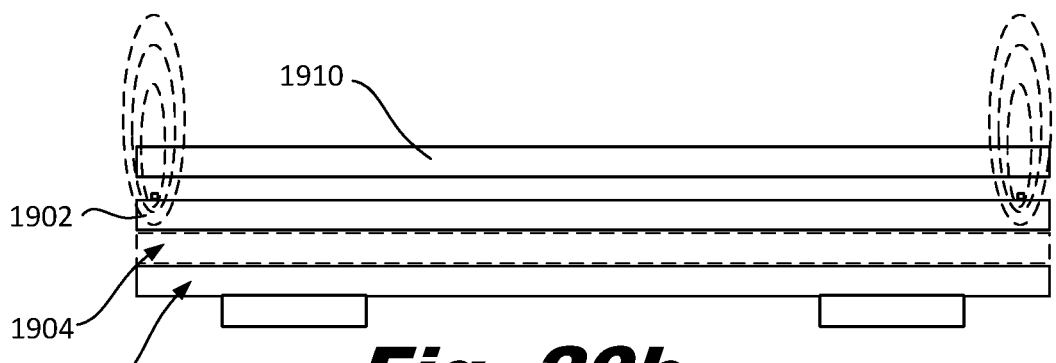
FIG. 20b depicts an example of a stack of layers in accordance with the disclosure.

FIG. 20*a* depicts an example of a layer 1902 with capacitance electrodes 2000 and an antenna 1900 positioned on the same layer 1902. While this example depicts the antenna 1900 surrounding the capacitance electrodes 2000, in other examples, the antenna 1900 may only surround a portion of the capacitance electrodes 2000 or be positioned to the side of the capacitance electrodes 2000. FIG. 12*b* depicts an example where MCEI layer 1904 is below the layer 1902 with the capacitance electrodes 2000, and where the capacitance electrodes 2000 are on the same surface as the antenna 1900.

FIG. 21a depicts an example of an antenna 1900 on a substrate 2100, such as a substrate that is part of a stack of layers in a capacitance module. In this example, MCEI material is positioned adjacent to three sides of the antenna 1900 and may prevent an inductive field from the antenna 1900 from reaching a haptic actuator 2150 attached to 2106. A first portion 2102 of MCEI material is positioned adjacent to a first side of the antenna 1900, a second portion 2104 of the MCEI material is positioned adjacent to a second side of the antenna 1900, and a third portion 2106 of the MCEI material is positioned adjacent an underside 2110 of the antenna 1900.

In the illustrated example, the first portion 2102 of the MCEI material and the second portion 2104 of the MCEI material may be part of a single continuous piece of MCEI material. In some cases, the first and second portions 2102, 2104 of the MCEI material has the same magnetically conductive and/or electrically insulating properties as each other, but in other examples, the first and second portions 2102, 2104 of the MCEI material may have different magnetically conductive and/or electrically insulating properties.

In the example depicted in FIG. 21a, the third portion 2106 of the MCEI material is deposited on an underside 2108 of the substrate 2100. In this example, the third portion 2106 of the MCEI material is shown covering the entire surface area of the substrate's underside 2108. However, in other examples, just a subsection of the substrate's underside may be covered with the MCEI material. In some examples, the third portion 2106 of the MCEI material has the same magnetically conductive and/or electrically insulating properties as either the first portion 2102 and/or the second portion 2104 of the MCEI material. However, in other examples, the first and/or second portions 2102, 2104 of the MCEI material may have different magnetically conductive and/or electrically insulating properties than the third portion 2106 of the MCEI material.

In some examples, the magnetic field generated by an inductive-type antenna may be redirected away from the haptic actuator 2150 by the MCEI material. Thus, as illustrated in the example of FIG. 21a, the magnetic field may be forced in a direction away from the first, second, and third portions 2102, 2104, 2106 of the MCEI material. In this example, the magnetic field is redirected in the opposite direction of the haptic actuator 2150 since the underside 2108 of the substrate is adjacent MCEI material 2106. For example, the MCEI material 2106 on the underside 2108 of the substrate 2100 may not allow the magnetic field to pass through thereby forcing the magnetic field in another direction. In the example of FIG. 21a, the first portion 2102 of the MCEI material may prevent the magnetic field from freely moving away from the first side of the antenna 1900, and the second portion 2104 of the MCEI material may prevent the magnetic field from freely moving away from the second side of the antenna 1900. As a result, the magnetic field is directed primarily away from the antenna 1900 from just one side of the antenna 1900 thereby concentrating the influence of the magnetic field in a single direction. In examples where a capacitance reference surface 212 is positioned over a front side of the substrate 2100, the MCEI material may redirect the magnetic field of the antenna 1900 through the capacitance reference surface 212.

FIG. 21b depicts an example of an antenna 1900 deposited on a substrate 2100 with an outer ring 2162 made of a single piece of MCEI material surrounding an outside of the antenna 1900. In this example, the outer ring 2162 of MCEI material and the antenna 1900 are on the same surface 2160 of the substrate 2100. The outer ring 2162 of MCEI material may be used to direct the magnetic field of the antenna 1900 in a pre-determined direction. In some cases, the underside of the substrate 2100 in the example of FIG. 21b is also adjacent to MCEI material. However, in other examples, the substrate in FIG. 21b is not adjacent to MCEI material. In other examples, other components of the capacitance module may be located on the substrate with the antenna depicted in FIG. 21b and the ring of MCEI material may direct the magnetic field of the antenna away from those components.

An inner ring 2164 of MCEI material is also depicted in the example of FIG. 21b. In this example, at least a portion of the inner ring 2164 is adjacent to an inside surface of the antenna 1900. While the MCEI material in this example is depicted as a ring, in other examples, the MCEI material may be a solid material, a circular shape, a triangular shape, a square shape, an asymmetric shape, another type of shape, in segments, or combinations thereof. In some cases, having MCEI material adjacent an inside surface and adjacent an outside surface of an antenna may contribute to directing the magnetic field of the antenna.

FIG. 21c depicts an example where the MCEI material 2120 is adjacent to just an outside of the antenna 1900. In this example depicted in FIG. 21c, the MCEI material may direct the inductive field away from the haptic actuators 2150 incorporated into the capacitance module. In the example of FIG. 21d, multiple segments 2130 of MCEI material is positioned adjacent to different sides of the antenna 1900. In this example depicted in FIG. 21d, the MCEI material may direct the inductive field away from the haptic actuators 2150 incorporated into the capacitance module. In some cases, surrounding the entire perimeter of the antenna may not be necessary to achieve the desired shield effects and/or the desired focusing effects or redirecting the magnetic field. Thus, by using less MCEI material than necessary to completely surround the antenna, quicker manufacturing and lower material costs may be achieved.

Figure 22:
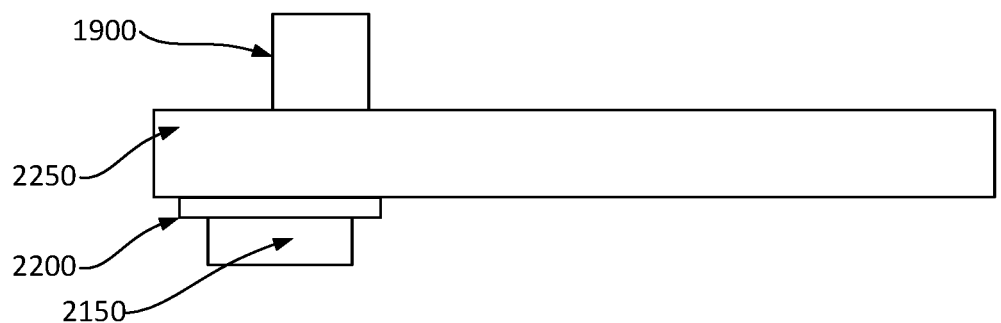
FIG. 22 depicts an example of a segment of MCEI material positioned between the antenna and the haptic actuator in accordance with the disclosure.

FIG. 22 depicts an example where a segment of MCEI material 2200 is positioned between the antenna 1900 and the haptic actuator 2150. In this example, the entire portion of the underside of the substrate is not covered with the MCEI material. In some examples, the size of the MCEI material may be about the same area that the haptic actuator 2150 occupies on the substrate 2250. In some examples, the MCEI material has a size that is between 75 percent and 200 percent of the area that the haptic actuator occupies on the substrate 2250.

Figure 23:
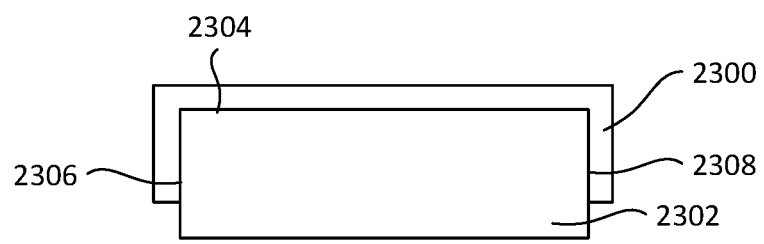
FIG. 23 depicts an example of MCEI material in accordance with the disclosure.

FIG. 23 depicts an example of a MCEI material 2300 that covers a first side 2304 of a housing for a haptic actuator housing 2302. The MCEI material 2300 is also shaped to cover at least a second side 2306 of the housing and a third side 2308 of the housing. In some cases, the first, second, and third sides are contiguous. In some examples, the first side connects the second and third sides. Further, in some cases, the second side is opposite the third side. In some cases, the MCEI material 2300 covers the entire first side or just a portion of the first side. In some cases, the MCEI material 2300 covers the entire second side or just a portion of the second side. In some cases, the MCEI material 2300 covers the entire third side or just a portion of the third side. While not depicted in the example of FIG. 23, the MCEI material 2300 may additional cover at least a portion of a fourth side, at least a portion of a fifth side, and/or at least a portion of a sixth side.

In some examples, the haptic housing may be at least partially made of an MCEI material, may be at least partially coated in an MCEI material, incorporate an MCEI material, or combinations thereof. In some examples, the haptic actuator housing may include a liner that is includes an MCEI material.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
    at least one capacitance sensor layer;
    an antenna connected to the capacitive sensor layer; and
    at least one haptic actuator connected to the capacitive sensor layer; and
an electrically conductive shield is between the antenna and the haptic actuator.

2. The module of claim 1, wherein the antenna is indirectly connected to the capacitive sensor layer through at least one additional layer of the capacitance sensor module.

3. The module of claim 1, wherein the haptic actuator is indirectly connected to the capacitive sensor layer through at least one additional layer of the capacitance sensor module.

4. The module of claim 1, further including a magnetically conductive, electrically insulating barrier between the antenna and the haptic actuator.

5. The module of claim 4, wherein the magnetically conductive, electrically insulating barrier has a characteristic of preventing and/or reducing the formation of eddy currents in the haptic actuator by at least reducing an influence a magnetic field generated by the antenna from affecting the haptic actuator.

6. The module of claim 4, further comprising an electrically conductive shield connected to the capacitive sensor layer.

7. The module of claim 6, wherein the electrically conductive shield is indirectly connected to the capacitive sensor through at least one additional layer of the capacitance sensor module.

8. The module of claim 6, wherein the electrically conductive shield is between magnetically conductive, electrically insulating barrier and the haptic actuator.

9. The module of claim 4, wherein the electrically conductive, electrically insulating barrier comprises ferrite.

10. The module of claim 1, wherein the antenna is on the at least one capacitive sensor layer.

11. The module of claim 1, wherein the antenna is configured to transmit a wireless signal according to a Wi-Fi protocol.

12. The module of claim 1, wherein the antenna is configured to transmit a wireless signal according to a short-range wireless protocol.

13. The module of claim 1, wherein the antenna is configured to transmit a wireless signal according to a Near Field Communication (NFC) protocol.

14. The module of claim 1, wherein the haptic actuator includes at least one piezoelectric element.

15. The module of claim 1, wherein the haptic actuator is configured to a sense a pressure applied through the at least one capacitance sensor layer.

16. An electronic device, comprising:
    a capacitance reference surface incorporated into a device surface;
    a capacitance module connected to the capacitance reference surface, the capacitance module comprising:
        at least one capacitive sensor layer;
        an antenna connected to the capacitive sensor layer; and
        at least one haptic actuator connected to the capacitive sensor layer;
    an electrically conductive shield is between the antenna and the haptic actuator;
    wherein the electrically conductive shield blocks signals from the antenna from reaching the haptic actuator.

17. The device of claim 16, further including a magnetically conductive, electrically insulating barrier between the antenna and the haptic actuator.

18. The device of claim 17, wherein the magnetically conductive, electrically insulating barrier has a characteristic of preventing and/or reducing the formation of eddy currents in the haptic actuator by at least reducing an influence a magnetic field generated by the antenna from affecting the haptic actuator.

19. The device of claim 17, wherein the magnetically conductive, electrically insulating barrier has a characteristic of focusing a magnetic field of the antenna through the capacitance reference surface.

20. The device of claim 16, wherein the haptic actuator is a piezoelectric element that is configured to provide a haptic response detectable on the capacitance reference surface and sense a pressure applied through the capacitance reference surface.

* * * * *